I. KOECHLIN.
ELASTIC COUPLING FOR MOTOR GEARING.
APPLICATION FILED DEC. 29, 1911.
1,072,622.  Patented Sept. 9, 1913.
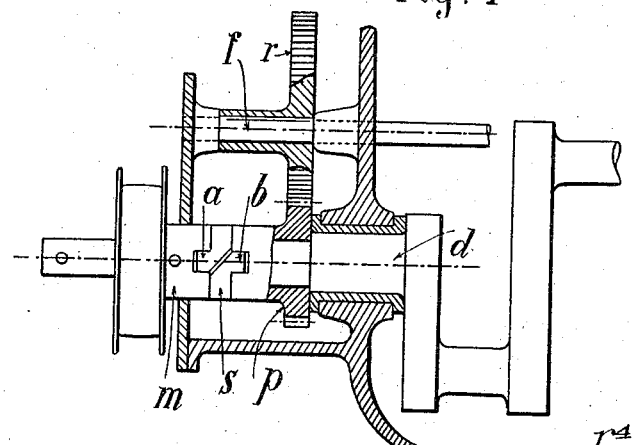
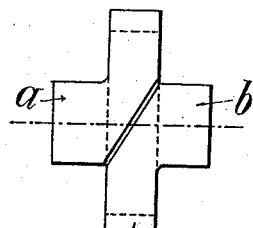
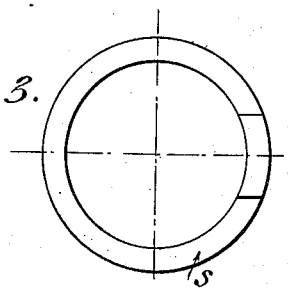
Inventor
Isaac Koechlin

UNITED STATES PATENT OFFICE.

ISAAC KOECHLIN, OF LEVALLOIS-PERRET, FRANCE, ASSIGNOR TO SOCIÉTÉ ANONYME DES AUTOMOBILES ET CYCLES PEUGEOT, OF PARIS, FRANCE.

ELASTIC COUPLING FOR MOTOR-GEARING.

1,072,622.

Specification of Letters Patent. Patented Sept. 9, 1913.

Application filed December 29, 1911. Serial No. 668,426.

*To all whom it may concern:*

Be it known that I, ISAAC KOECHLIN, citizen of Switzerland, residing at 71 Rue Danton, Levallois-Perret, Seine, in the Republic of France, have invented new and useful Improvements in Elastic Couplings for Motor-Gearing, of which the following is a specification.

The present invention relates to an improved elastic coupling for motor gearing of the kind comprising an elastic member between the crank and the cam shaft or shafts of an explosion motor.

According to the invention the elastic member consists of a spring in the form of a cylindrical split ring which surrounds the crank shaft or the cam shaft, the ring being provided with two lugs extending laterally and circumferentially on each side of the ring and which engage in recesses of the hub of the pinion the slit in the ring being formed obliquely and extending from the edge of one lug to the opposite edge of the other lug.

In the annexed drawing given by way of example, Figure 1 is a section passing through the axis of the crank shaft and the axis of one of the cam shafts and shows a method of carrying the invention into effect. Fig. 2 is an outer view of an elastic member employed in the arrangement of Fig. 1. Fig. 3 is a side view of Fig. 2. Fig. 4 is a section similar to Fig. 1 showing another method of carrying the invention into effect.

As can be seen from Fig. 1 the pinion $p$ freely mounted on the crank $d$, drives the wheel $r$ keyed on the cam shaft $f$. A driving sleeve $m$ which may be, if necessary, constituted by hub of the driving pulley of the fan, is keyed on the crank shaft. The hub of the pinion $p$ and the sleeve $m$ are each provided with a recess. Between these two parts an elastic member $s$ is interposed mounted on the crank shaft. This member is constituted by a cylindrical ring provided with two tenons or lugs $a\ b$ and is split between these tenons. The two tenons $a$ and $b$ engage, the first in the recess of the sleeve $m$ and the second in the recess of the pinion $p$ in such a way that the rotation of the sleeve $m$ keyed on the crank shaft is transmitted elastically by the member $s$ to the pinion $p$. The slit formed in this member gives it in effect the desired elasticity so that shocks, vibrations, torsions and irregularities of movement are absorbed in such a way that the movement of rotation of the pinion is continuous and changes of direction of thrust in the toothed gear are prevented.

As shown in Fig. 4 the elastic member can equally well be mounted on the cam shaft $f$. In this case the pinion $p^4$ is keyed on the crank $d$ and the wheel $r^4$ is freely mounted on the cam shaft.

Having now described my invention what I claim as new and desire to secure by Letters Patent is:

1. An elastic coupling of the kind described comprising in combination a cylindrical split ring provided with lugs arranged opposite one another and extending laterally and circumferentially of the ring, a shaft, a driving pinion loosely mounted thereon and provided with a recess in which engages one of the lugs of the split ring, and a sleeve keyed on the shaft and provided with a recess in which engages the other lug of the split ring, substantially as described and for the purpose set forth.

2. An elastic coupling for motor gearing comprising in combination a cylindrical split ring provided with lugs arranged opposite one another and extending laterally, and circumferentially of the ring, the slit in said ring being formed obliquely and extending from the edge of one lug to the opposite edge of the other lug, a shaft, a pinion loosely mounted thereon and provided with a recess in which engages one of the lugs of the split ring, and a sleeve keyed on the shaft and provided with a recess in which engages the other lug of the split ring, substantially as described and for the purpose set forth.

In testimony whereof I have signed my name to this specification in the presence of two subscribing witnesses.

ISAAC KOECHLIN.

Witnesses:
 LOUIS YOST,
 BARTLEY F. YOST.

Copies of this patent may be obtained for five cents each, by addressing the "Commissioner of Patents, Washington, D. C."